United States Patent [19]
Villani

[11] 3,919,313
[45] Nov. 11, 1975

[54] NOVEL 1-N-(α-AMINOACETYL) AMINOADAMANTANES

[75] Inventor: Frank J. Villani, West Caldwell, N.J.

[73] Assignee: Schering Corporation, Kenilworth, N.J.

[22] Filed: Aug. 26, 1974

[21] Appl. No.: 500,834

Related U.S. Application Data

[63] Continuation-in-part of Ser. No. 381,849, July 23, 1973, abandoned.

[52] U.S. Cl........... 260/558 A; 260/561 A; 424/324
[51] Int. Cl.²...................................... C07C 103/28
[58] Field of Search.................... 260/558 A, 561 A

[56] References Cited
FOREIGN PATENTS OR APPLICATIONS
1,006,885    10/1965    United Kingdom

OTHER PUBLICATIONS

"Antiviral Agents", Aldrich et al., J. Med. Chem., vol. 14, pp. 535–543 (1971).

"Advances in the Chemistry of Adamantane", Sevost'yanova et al., Russian Chemical Reviews, 39 (10), pp. 817–833 (1970).

*Primary Examiner*—Allen B. Curtis
*Assistant Examiner*—Thomas A. Waltz
*Attorney, Agent, or Firm*—Stephen B. Coan; Raymond A. McDonald

[57]            ABSTRACT

This application relates to certain novel 1-N-(α-aminoacetyl) aminoadamantanes and their use as antiviral agents.

8 Claims, No Drawings

NOVEL 1-N-(α-AMINOACETYL) AMINOADAMANTANES

This application is a continuation-in-part application of my copending application, Ser. No. 381,849, filed July 23, 1973 and now abandoned.

This invention relates to certain novel compositions classified as 1-N-(α-aminoacetyl)aminoadamantanes, to processes for their preparation, and to the process of using said compositions as antiviral agents.

The novel 1-N-(α-aminoacetyl)aminoadamontanes have the structural formula:

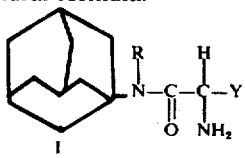

and include the pharmaceutically acceptable acid addition salts thereof, wherein R represents hydrogen and lower alkyl of less than four carbon atoms, Y represents lower alkyl, phenyl, benzyl and halophenyl.

In general, the compounds of this invention are prepared by a series of steps initiated by the reaction wherein an amino-Y-substituted acetic acid, having an easily cleavable protective group attached to the nitrogen atom, is reacted with a chloroformic acid ester and the resulting mixed anhydride is reacted with the appropriate 1-aminoadamantane.

The amino protecting groups of the resulting 1-N-[(α-amino-α-Y)acetyl] aminoadamantane is then removed to produce a desired compound of formula I. The initial reaction is preferably effected by bringing together equimolar quantities of the reactants in the presence of a base, in a suitable nonreactive solvent such as acetone, tetrahydrofuran, toluene, ether, dioxane, and the like. The reactants are caused to react within a temperature range of about 0°C to −20°C, preferably at the lower end of the range. Although other chloroformic acid esters may be used, it is preferred to employ those esters formed with lower alkanols; preferably ethyl chloroformate. Although other organic bases may be employed, the preferred organic base is triethylamine. Although almost any of the known amino-protecting groups which are removable by reductive hydrogenation or addition of an alkali metal and ammonia may be used, it is preferred to employ a carbobenzyloxy group.

The so-prepared mixed anhydride (III) is suitable for immediate reaction (without the necessity of isolation and/or purification) with the N-substituted-1-aminoadamantane (IV). Indeed, it is preferable to have the appropriate 1-aminoadamantane (IV) react with the mixed anhydride (III) as soon as possible. Reaction is effected by contacting the 1-aminoadamantane (IV) with the mixed anhydride at reduced temperatures of about −15°C to 20°C.

The amino protecting group may be removed by standard hydrogenation procedures, such as by hydrogenating in the presence of a catalyst such as 5% palladium on barium sulfate in acetic acid or by 5% palladium-on-carbon in dilute hydrochloric acid; the latter producing the desired compound in the form of its hydrochloric salt. Of course, in those instances wherein the cleavage is effected on a compound also containing a labile group — e.g. in those instances wherein the Y moiety contains a halogen, then other techniques, such as by reaction with liquid ammonia and metallic sodium is employed so as to prevent the halogen from being cleaved. When a desired compound (I) is prepared in the form of its free base, conversion to its pharmaceutically acceptable acid addition salt is effected by standard procedures well known in the art.

The foregoing reactions may be depicted as follows:

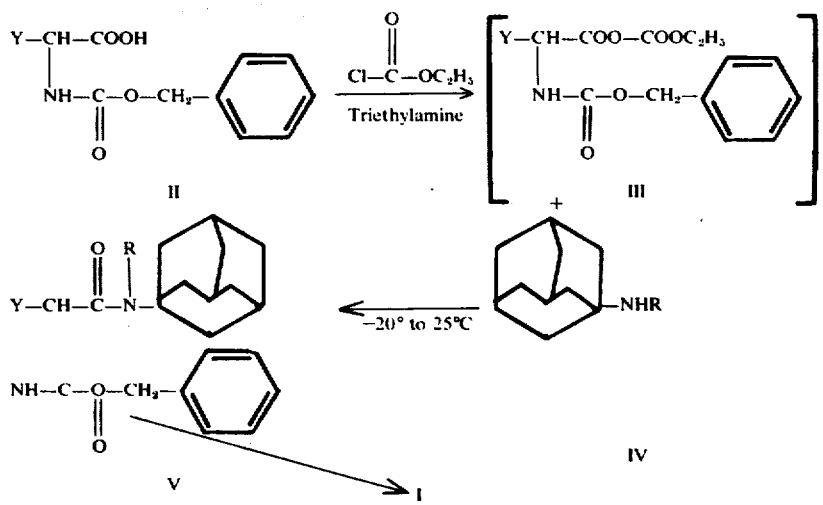

The following examples are illustrative of the processes used to obtain the products of this invention.

EXAMPLE 1 d(−)-1-N-[(α-Amino-α-phenyl)acetyl]aminoadamantane sulfate

Step 1: d(−)-1-N[(α-N-carbobenzyloxyamino-α-phenyl)acetyl]aminoadamantane:

Dissolve 14.3 gms. of N-carbobenzyloxy-d(−)phenylglycine in 420 ml. of acetone and add at 0° to −5°C, 8.3 ml. of triethylamine and 4.8 ml. of ethylchloroformate. Stir the resulting mixture for 20 minutes at this temperature and then cool to −20°C. Add, as quickly as possible, a suspension of 7.5 gm. of 1-aminoadamantane in 50 ml. of toluene and 50 ml. of acetone. Remove the cooling bath and with constant stirring allow mixture to warm to room temperature over a period of 2–3 hours. Pour the warmed mixture into water and extract with chloroform. Wash the chloroform solution successively with dilute (10%) hydrochloric acid, water, dilute (10-15%) sodium carbonate and finally water. Concentrate the washed chloroform extract by removing 80-90% of the chloroform on a steam bath and to the resulting residue add hexane or petroleum ether to precipitate the product. Filter the product and recrystallize from a mixture of benzene-petroleum ether to obtain d(−)-1-N[(α -N-carbobenzyloxyamino-α-phenyl)acetyl]aminoadamantane.

Step 2: d(−)-1-N[(α-Amino-α-phenyl)acetyl-]aminoadamantane sulfate:

Method A — Suspend 5 gms. of 5% palladium on barium sulfate catalyst in 40 ml. of glacial acetic acid and add 4.28 gms. of d(−)-1-N[(α-N-carbobenzyloxyamino-α-phenyl)acetyl]aminoadamantane. Hydrogenate this mixture in a Parr hydrogenator at room temperature at approximately 28 psi. The theoretical amount of hydrogen is adsorbed in 10 minutes but the reaction is allowed to run 60 minutes to ensure completion of the reaction. Filter, concentrate the filtrate to a syrup, add water and basify with sodium carbonate solution. Extract the solution with chloroform, water-wash and concentrate the chloroform extract. The resulting residue shows a strong NH band in the infrared and a strong amide band at 6.0 $\mu$. The carbobenzyloxy band at 5.85 $\mu$ is missing. Dissolve the residue in absolute ether and precipitate the amine with concentrated sulfuric acid. The precipitated sulfate salt is filtered and recrystallized from ethanol-ether to give d(−)-1-N[(α-amino-α-phenyl)acetyl]aminoadamantane sulfate.

Alternatively, the foregoing may also be effected by the following procedure.

Method B — Suspend 8.5 gms. of d(−)-1-N-[(α-N-carbobenzyloxy amino-α-phenyl)acetyl]aminoadamantane in 100 ml. of ethanol containing 10 ml. of concentrated hydrochloric acid and hydrogenate in a Parr hydrogenator in the presence of 5 gm. of 5% palladium-on-carbon at room temperature at a pressure of 25-40 psi. The reduction is very rapid (15 minutes) but is permitted to run for 30 minutes. Filter off the catalyst, concentrate the filtrate to a small volume (20-30 ml.) and add a large excess of absolute ether to precipitate the d(−)-1-N-[(α-amino-α-phenyl)acetyl]aminoadamantane hydrochloride.

Similarly, by following the teachings of the foregoing examples with the appropriate substitution of the reactants there is prepared: 1-N[(α-amino-α-benzyl)acetyl]aminoadamantane; 1-N-[(α-amino)acetyl]aminoadamantane; 1-N-[(α-amino-α-ethyl)acetyl]aminoadamantane; d(−)-1-N-methyl-N-[(α-amino-α-phenyl)acetyl]aminoadamantane; d(−)-1-N-ethyl-N-[(α-amino-α-phenyl)acetyl]aminoadamantane; 1-N-[(α-amino-α-parachlorophenyl)acetyl]aminoadamantane.

In the case of 1-N-[(α-amino-α-parachlorophenyl)acetyl]aminoadamantane, the chlorine is a reducible moiety so that the synthesis differs in that the 1-N-[(α-N-carbobenzyloxyamino-α-parachlorophenyl)acetyl]aminoadamantane is produced with the appropriate reactants by the procedure of Example I, Step 1. The desired compound, however, is produced by the method of Example II.

Example II

1-N-[(α-Amino-α-parachlorophenyl)acetyl]aminoadamantane

Dissolve 8.7 gms. of 1-N-[(α-N-carbobenzyloxyamino-α-parachlorophenyl)acetyl]aminoadamantane in approximately 200 ml. of anhydrous ammonia and add, portionwise, 10-15 gms. of sodium metal. Stir the ammonia solution for 2 hours and then cautiously add 50-75 gms. of ammonium chloride. Allow the ammonia to evaporate, dissolve the residue in water, and extract with chloroform. Water-wash and concentrate the chloroform extracts to obtain a residue which is recrystallized from acetonitrile or a mixture of ethyl acetate and petroleum ether to obtain 1-N-[(α-amino-α-parachlorophenyl)acetyl]aminoadamantane.

Conversion of the foregoing compounds to other pharmaceutically acceptable salts may be effected by standard techniques.

According to standard and well-recognized techniques the antiviral activity of the compounds of this invention (I) is readily ascertained. For example, in their effect against influenza A-2 (Bethesda) in mice, it has been ascertained that the compounds, upon oral administration, protect against a lethal virus challenge at a dose of about 40 MPK. From these tests, as well as by comparison with other compounds known to have effective antiviral activity, it may be stated that the compounds of this invention are prophylactically and therapeutically useful as antiviral agents. Thus, the compounds of this invention are useful for eliciting an antiviral effect in mammals suitable for the prevention and/or amelioration of viral infections.

For purposes of the invention, oral administration is preferred, although, if desired, administration can be parenterally i.e., subcutaneously, intraveneously, intramuscularly or intraperitoneally. In the case of treating infections such as viral influenza and viral pneumonia, administration also can be by vapor or spray through the mouth or nasal passages.

The dosage administered will be dependent upon the disorder being treated, the age, health and weight of the recipient, kind of concurrent treatment, if any, frequency of treatment, and the nature of the effect desired. Generally, a daily dosage of the active ingredient will be from about 1 to 200 milligrams per kilogram of body weight. Ordinarily, from 1 to 50 and preferably 1 to 20 milligrams per kilogram per day, in one or more applications per day, is effective to obtain the desired result.

I claim:

1. A compound of the formula:

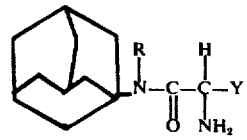

and the pharmaceutically acceptable acid addition salts thereof wherein R is a member of the group consisting of hydrogen, and lower alkyl of less than four carbon atoms, Y represents phenyl, benzyl and halophenyl.

2. A compound of claim 1 wherein R is methyl.

3. A compound of claim 2 wherein Y is phenyl, said compound being d(−)-1-N-methyl-N-[(α-amino-α-phenyl)acetyl]aminoadamantane.

4. A compound of claim 2 wherein Y is benzyl, said compound being 1-N-methyl-N-[(α-amino-α-benzyl)acetyl]aminoadamantane.

5. A compound of claim 2 wherein Y is chlorophenyl, said compound being 1-N-methyl-N-[(α-amino-α-chlorophenyl)]aminoadamantane.

6. A compound of claim 1 wherein R is hydrogen.

7. A compound of claim 6 wherein Y is phenyl, said compound being d(−)-1-N-[(α-amino-α-phenyl)acetyl]aminoadamantane.

8. A compound of claim 6 wherein Y is benzyl, said compound being 1-N-[(α-amino-α-benzyl)acetyl]aminoadamantane.

* * * * *